(12) United States Patent
Kaneda et al.

(10) Patent No.: US 6,953,186 B2
(45) Date of Patent: Oct. 11, 2005

(54) SOLENOID-OPERATED VALVE

(75) Inventors: Yoshinori Kaneda, Okazaki (JP); Masaya Segi, Okazaki (JP); Mikio Suzuki, Hekinan (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 57 days.

(21) Appl. No.: 10/777,894

(22) Filed: Feb. 13, 2004

(65) Prior Publication Data

US 2004/0208391 A1 Oct. 21, 2004

(30) Foreign Application Priority Data

Feb. 13, 2003 (JP) ....................................... 2003-035238

(51) Int. Cl.[7] .......................... F16K 31/06; F16K 39/04
(52) U.S. Cl. .............................. 251/129.2; 251/129.15; 251/129.21
(58) Field of Search ..................... 251/129.15, 129.2, 251/129.21

(56) References Cited

U.S. PATENT DOCUMENTS

| 4,252,505 | A | * | 2/1981 | Toyoda ....................... 417/417 |
| 5,848,613 | A | | 12/1998 | Sakaguchi et al. |
| 6,498,416 | B1 | | 12/2002 | Oishi et al. |
| 6,695,284 | B2 | * | 2/2004 | Isobe et al. ............. 251/129.15 |
| 2001/0013584 | A1 | | 8/2001 | Matsusaka et al. |
| 2002/0101314 | A1 | | 8/2002 | Oishi et al. |
| 2002/0139951 | A1 | * | 10/2002 | Kawamura et al. .... 251/129.15 |
| 2003/0047699 | A1 | * | 3/2003 | Sakata et al. .......... 251/129.15 |

FOREIGN PATENT DOCUMENTS

JP 1-242884 9/1989

* cited by examiner

Primary Examiner—J. Casimer Jacyna
(74) Attorney, Agent, or Firm—Oblon, Spivak, McClelland, Maier & Neustadt, P.C.

(57) ABSTRACT

Disclosed is a solenoid-operated valve which hardly brings a plunger into a lock and is capable of improving its responsivety. In the solenoid-operated valve, the plunger slidably guided in an inner bore formed in a yoke and a core aligned axially is moved by energizing an electromagnetic coil, and a spool in a valve section is moved through a rod portion which protrudes from an end of the plunger to pass through a center hole of the core. An electromagnetic section fluid chamber defined by a forward end surface of the plunger and the inner bore of the core communicates with an intermediate fluid chamber defined between the core and a valve sleeve, through a clearance between the center hole and rod portion. The spool is provided at one end thereof with a land portion whose end surface defines a part of the intermediate fluid chamber. The diameter of the land portion is chosen to be the same as the diameter of the plunger, so that the sum in volume of the electromagnetic section fluid chamber and the intermediate fluid chamber can be kept invariable regardless of movement of the plunger. A supply/drain passage is further provided to permit the oil around the solenoid-operated valve to be charged into the rear end fluid chamber or discharged therefrom upon movement of the plunger.

4 Claims, 2 Drawing Sheets

SOLENOID-OPERATED VALVE

INCORPORATION BY REFERENCE

This application is based on and claims priority under 35 U.S.C. sctn. 119 with respect to Japanese Application No. 2003-35238 filed on Feb. 13, 2003, the entire content of which is incorporated herein by reference.

BACKGROUND OF THE INVENTION

1. Field of the Invention

The present invention relates to a solenoid-operated valve of the type that a spool of a valve section is operated upon movement in the axial direction of a plunger of an electromagnetic drive section and in particular, to a solenoid-operated valve which is suitable for use inside of an oil pan of an electronic controlled automatic transmission for a motor vehicle.

2. Discussion of the Related Art

Heretofore, as solenoid-operated valves of this type, there has been known one described in the item of "Prior Art" of a Japanese unexamined, published patent application No. 1-242884 (1989-242884). In the known solenoid-operated valve, a first solenoid housing (core) and a second solenoid housing (yoke) are arranged serially in axial alignment, and a plunger is slidably guided in a guide bore formed in the solenoid housings. By magnetizing the solenoid housings with a solenoid, the plunger is axially moved against a spring, so that a spool in a spool or valve housing attached to the first solenoid housing (core) is operated. Since the space, defined between an end surface of the plunger and a cover, in the guide bore formed in the second solenoid housing (yoke) is to vary its volume as the plunger moves, it is in communication with the external of the solenoid-operated valve through a supply/drain passage formed at, e.g., the center of the plunger to pass therethrough. In this technology, the plunger is slidably guided in the guide bore, and this may give rise to brining the plunger into a lock when foreign matter gets in-between the internal surface of the guide bore and the external surface of the plunger.

To obviate this problem, in a known solenoid-operated valve described in the body of the aforementioned Japanese application, a plunger is constituted by a movable member made of a magnetic material and a rod. The movable member with a press-fitting hole at the center thereof is inserted into a guide bore formed in solenoid housings to be movable back and forth, and the rod is press-fit into the press-fitting hole of the movable member to be protruded from the movable member toward a spool. One end of the rod is press-fit into a fitting hole formed on one end of the spool so that the movable member is supported by the spool without being contacted with the guide bore.

However, in the latter mentioned technology, it is unavoidable to increase the space between the external surface of the plunger made of a magnetic material and the internal surface (i.e., the guide bore) of the solenoid housings. This causes the magnetic resistance in the magnetic circuit to increase thereby to weaken the magnetization of the solenoid housings and the movable member. Thus, the magnetic attracting force exerted on the plunger is weakened, whereby the operating characteristic of the solenoid valve becomes unstable, or whereby the solenoid has to be enlarged to obtain the same operating characteristic.

A technology shown in FIG. 3 may be conceived of as one which is able to solve the aforementioned drawback. The solenoid-operated valve shown in FIG. 3 is composed of an electromagnetic drive section 1 and a valve section 5. In the electromagnetic drive section 1, a yoke 2a and a core 2b each made of a magnetic material are arranged serially in axial alignment through an air gap (i.e., non-magnetic portion) 2d, and the axial opposite ends of the yoke 2a and the core 2b are magnetically connected with each other through a cover 2c which covers the yoke 2a and the core 2b thereby to constitute a stator 2. A plunger 3 is slidably guided in a bore 2e which is formed in the stator 2 over the yoke 2a and the core 2b, and an electromagnetic coil 4 is provided between the yoke 2a and the core 2b inside the cover 2c. Further, the valve section 5 is constituted by inserting a spool 7 slidably in a valve hole of a valve sleeve 6 attached to the stator 2. The spool 7 is urged toward the plunger 3 by means of a spring 9a interposed between itself and a plug member 9 secured to a forward end portion of the valve sleeve 6 and is brought into abutting engagement with the plunger 3 at a rod portion 7c thereof protruding from a rear end portion thereof. Thus, in the inoperative state, the rear end of the plunger 3 is kept in abutting contact with an inner bottom surface of the cover 2c through a washer, as depicted at the upper half in FIG. 3. When electric current is applied to the electromagnetic coil 4, on the contrary, the stator 2 is magnetized in proportion to the magnitude of the electric current applied thereto. Thus, the plunger 3 is attracted toward the core 2b against the spring 9a thereby to operate the valve section 5 through the movement of the spool 7, as depicted at the lower half in FIG. 3.

This solenoid-operated valve is designed for use, e.g., with the valve sleeve 6 being inserted fluid-tightly into a fitting hole of a valve body (not shown) which is provided inside an oil pan of an automatic transmission. The opening degrees of a supply port 6a and a drain port 6c of a valve sleeve 6 at both sides of a control port 6b are increased or decreased reversely with each other in proportion to the moving amount of the spool 7 having two large-diameter land portions 7a, whereby the oil output from the control port 6b is controlled in pressure as well as in volume. An annular groove which is formed inside the valve sleeve 6 between one of the large-diameter land portions 7a and a small-diameter land portion 7b is isolated from the external thereby to define a feedback chamber 6d, to which the control pressure in the control port 6b is applied through a cutout 6e formed at a part of the external surface of the valve sleeve 6 and also through a communication hole 6f.

A rear end fluid chamber (E) is defined between the rear end surface of the plunger 3 and the inner bottom surface of the cover 2c in the bore 2e formed in the yoke 2a. An electromagnetic section fluid chamber (F) is formed between the bore 2e of the core 2b and the forward end surface of the plunger 3. The rear end fluid chamber (E) communicates with the electromagnetic section fluid chamber (F) through communication grooves 3a formed over the entire length of the plunger 3. An intermediate fluid chamber (H) is formed between the core 2b and the valve sleeve 6 and communicates with the electromagnetic section fluid chamber (F) through a clearance (G) between a center hole of the core 2b and a rod portion 7c of the spool 7. Further, the intermediate fluid chamber (H) further communicates with the external of the solenoid-operated valve through a communication passage 8. That is, the communication grooves 3a, the electromagnetic section fluid chamber (F), the clearance (G), the intermediate fluid chamber (H) and the communication passage 8 constitute a supply/drain passage, through which the rear end fluid chamber (E) is in fluid communication with the external of the solenoid-operated valve. The communication passage 8 takes the form of a labyrinth which is composed of an annular groove 8a formed coaxially with the intermediate fluid chamber (H) and cutouts 8b, 8c which make the annular groove 8a communicate with the intermediate fluid chamber (H) as well as with the external of the solenoid-operated valve. The rear end fluid chamber (E) varies its volume in proportion to the movement of the plunger 3, and in the case where the solenoid-operated valve is provided inside the oil pan, such variation in volume causes the oil around the valve sleeve 6 to be charged into the rear end fluid chamber (E) through the supply/drain passage or to be discharged therefrom.

In the technology shown in FIG. 3, since the plunger 3 made of a magnetic material is received slidably in the bore 2e formed in the yoke 2a and the core 2b and since the clearance therebetween is small, it does not take place that the magnetic resistance in the magnetic circuit constituted by these members increases to weaken the magnetization of the stator 2 and the plunger 3, and thus it is no longer required to make the magnetic coil 4 large for the same operating characteristic. Further, the surrounding oil around the solenoid-operated valve is charged into or discharged from the electromagnetic section fluid chamber (F) through the communication passage 8, the intermediate fluid chamber (H) and the clearance (G). However, since the communication passage 8 of a labyrinth shape composed of the annular groove 8a and the cutouts 8b, 8c is long and extends to move up and down in the case that the solenoid operated valve is used with the axis thereof extending horizontally or being inclined slightly with respect to a horizontal axis, the foreign matter such as iron powder which floats in the surrounding oil subsides or deposits to be separated from the oil while being moved back and forth through the annular groove 8. In addition to this, since the intermediate fluid chamber (H) has a substantial volume, it does not occur that the foreign matter easily comes into the electromagnetic section fluid chamber (F). It is to be noted that the technology shown in FIG. 3 is presented here for the purpose of comparison and does not constitute any known art. Of course, there cannot be found any literature which shows and describes the construction shown in FIG. 3.

However, in the technology shown in FIG. 3, the oil which passes through the clearance (G) between the center hole of the core 2b and the rod portion 7c of the spool 7 flows toward the left when the plunger 3 is moved toward the right against the spring 9a and toward the right when the plunger 3 is moved toward the left. That is, the moving direction of the rod portion 7c and the flowing direction of the oil passing through the clearance (G) are opposite to each other. Since the oil flow impedes the movement of the spool 7 due to the viscosity resistance, there is raised a problem that the responsivety of the solenoid-operated valve is degraded. This problem emerges remarkably when the viscosity of the oil is large at a low temperature.

In addition, the feedback chamber 6d to which the control pressure from the control port 6b is applied and the intermediate fluid chamber (H) whose inside pressure is zero by being in communication with the external through the communication passage 8 are separated by a fitting portion between the valve hole of the valve sleeve 6 and the small-diameter portion 7b of the spool 7, and the fitting portion has a small clearance for allowing the sliding movement of the spool 7. Thus, minute foreign matter floating in the oil supplied from the supply port 6a is led to the feedback chamber 6d through the cutout 6e and the communication hole 6f and then, leaks from the feedback chamber 6d through the small clearance into the intermediate fluid chamber (H) thereby to increase the amount of the foreign matter in the intermediate fluid chamber (H). Therefore, it may be liable that at an earlier stage than as expected, the foreign matter gets into the clearance between the internal surface of the hole 2e and the external surface of the plunger 3 to bring the plunger 3 into a lock.

SUMMARY OF THE INVENTION

Accordingly, it is a primary object of the present invention to provide an improved solenoid-operated valve which is capable of preventing a plunger from being locked and also capable of enhancing the responsivety thereof.

Briefly, according to the present invention, there is provided a solenoid-operated valve which comprises a stator having a yoke and a core arranged serially in axial alignment with each other, a plunger received in the stator to be slidably guided in an inner bore formed in at least one of the yoke and the core and urged by a spring in one direction, an electromagnetic coil for energizing the stator to move the plunger axially against the spring, a valve sleeve attached to an outer end portion of the core, and a spool received slidably in a valve hole of the valve sleeve and connected to the plunger through a rod portion thereof passing through a center hole of the core to be movable together with the plunger. An electromagnetic section fluid chamber is defined by a forward end of the plunger at the side of the valve sleeve and the inner bore of the core, and an intermediate fluid chamber is formed between the core and the valve sleeve and defined partly by an end surface of a land portion which is formed on the spool at the side of the core. A clearance is provided between the center hole and the rod portion for making the electromagnetic section fluid chamber and the intermediate fluid chamber communicate with each other. A rear end fluid chamber is formed between a rear end surface of the plunger and the inner bore of the yoke and is variable in its volume with the movement of the plunger. Further, the diameter of the plunger is chosen to be the same as that of the land portion, and the rear end fluid chamber communicates with the external of the solenoid-operated valve through a supply/drain passage.

With this configuration, since the diameter of the plunger is made the same as the diameter of the land portion, the sum in volume of the electromagnetic section fluid chamber and the intermediate fluid chamber which are in communication with each other through the clearance between the center hole and the rod portion is kept invariable or constant regardless of the movement of the plunger. The supply/drain passage permits the oil outside to be charged into or discharged from the rear end fluid chamber whose volume varies with the movement of the plunger. Consequently, it becomes unnecessary to provide any communication passage which would otherwise become necessary for making the intermediate fluid chamber communicate with the external and any communication groove (or communication hole, hereafter referred to simply as "communication groove") which would also otherwise become necessary for communication between the rear end fluid chamber and the electromagnetic section fluid chamber. In addition, the direction in which the oil flows through the clearance between the center hole and the rod portion upon movement of the plunger coincides with the moving direction of the rod portion. Thus, the viscosity of the oil flowing through the center hole of the core serves to aid or expedite the movement of the rod portion which is moved together with the spool, so that the responsivety of the solenoid-operated valve can be enhanced. Further, there can be omitted any communication passage for making the intermediate fluid chamber communicate with the external and any communication groove formed on the plunger for communication between the rear end fluid chamber and the electromagnetic section fluid chamber, the solenoid-operated valve can be simplified in construction. In particular, since the omission of such communication groove contributes to increasing the magnetic attraction force exerted on the plunger, the solenoid-operated valve can be downsized.

BRIEF DESCRIPTION OF THE ACCOMPANYING DRAWINGS

The foregoing and other objects and many of the attendant advantages of the present invention may readily be appreciated as the same becomes better understood by reference to a preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Hereinafter, a solenoid-operated valve in the first embodiment according to the present invention will be described with reference to FIGS. 1 and 2. The solenoid-operated valve in this particular embodiment is composed of an electromagnetic drive section 10 and a valve section 20 which are provided in axial alignment with each other.

Figure 1:
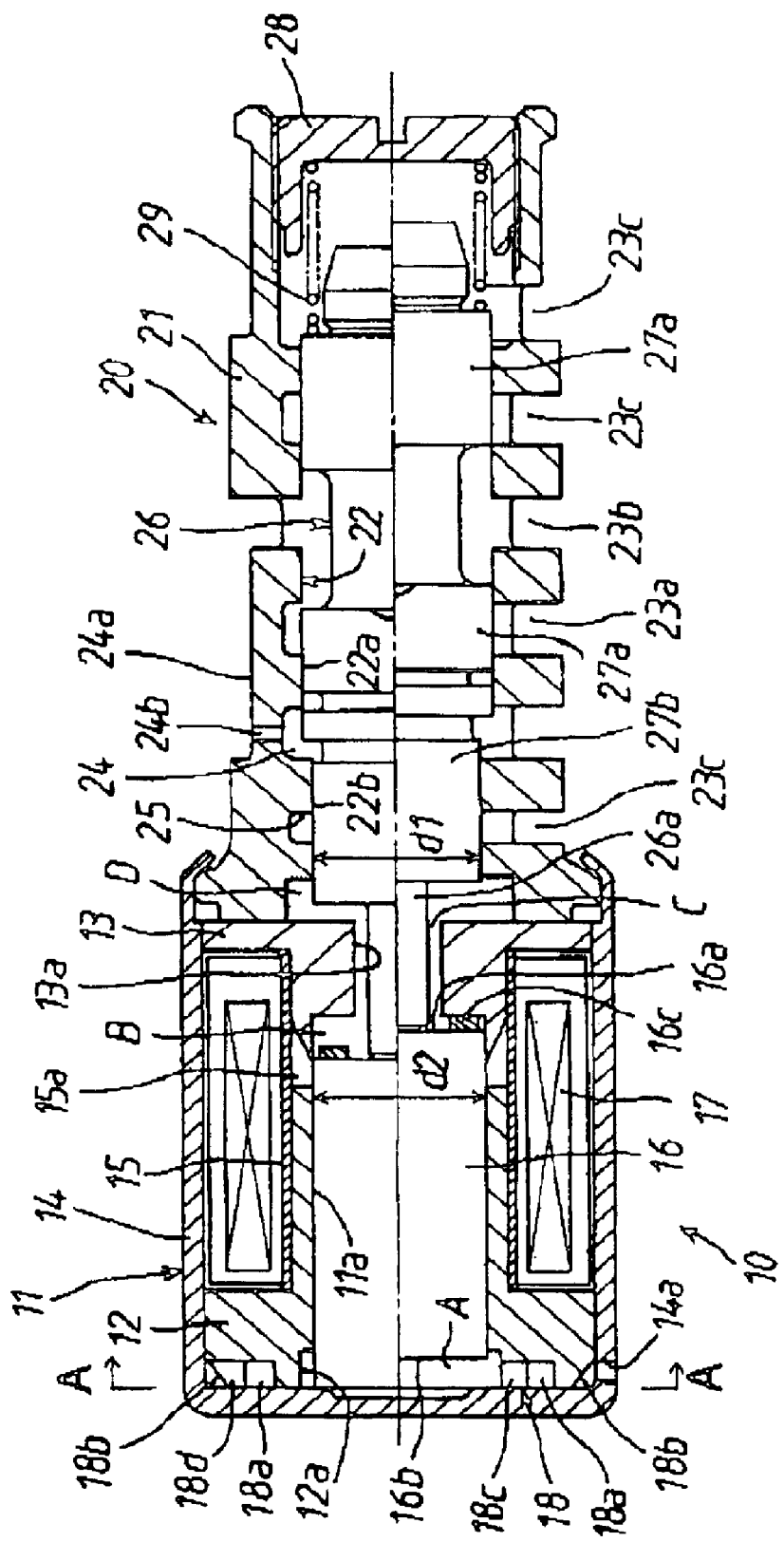
FIG. 1 is a longitudinal sectional view of a solenoid-operated valve in the first embodiment according to the present invention.

As shown in FIG. 1, the electromagnetic drive section 10 is composed primarily of a stator 11, a plunger 16 and an electromagnetic coil 17. The stator 11 includes a yoke 12 and a core 13 which are each made of a magnetic material and which are held in axial alignment through a pipe 15 made of a non-magnetic material, with an air gap (i.e., non-magnetic portion) therebetween. The stator 11 further includes a cover 14 of a magnetic material which covers the yoke 12 and the core 13 to magnetically connect the axial opposite ends thereof. An inner bore 11a of a single diameter is formed in the yoke 12 and the core 13 over the same. The yoke 12 is provided with a small-diameter portion inserted into an electromagnetic coil 17 and a large-diameter portion at the rear end thereof. The core 13 is provided with a small-diameter portion inserted into the electromagnetic coil 17 and a flange portion at a forward end portion opposite to the yoke 12. The core 13 is formed therein with a center hole 13a in axial alignment with the inner bore 11a. The cover 14 takes a cylindrical shape with a bottom (i.e., cup shape) whose inner surface is kept in abutting contact with the rear end surface of the yoke 12. As described later in detail, the opening end portion of the cover 14 is caulked thereby to hold the flange portion of the core 13 and the rear end surface of a valve sleeve 21 of the valve section 20 in abutting engagement with each other.

The plunger 16 is made of a magnetic material in its entirety and is guided and supported slidably in the inner bore 11a of the stator 11. The plunger 16 is movable between an advanced position (shown at the lower half in FIG. 1) where its forward end surface 16a at the side of the valve section 20 abuts on an inner end surface of the inner bore 11 formed in the core 13 through a washer 16c, and a retracted position (shown at the upper half in FIG. 1) where its rear end surface 16b abuts on the inner bottom surface of the cover 14. In the inner bore 11, an electromagnetic section fluid chamber (B) is defined between the forward end surface 16a of the plunger 16 and the inner bore 11a of the core 13, while a rear end fluid chamber (A) is defined between the inner bottom surface of the cover 14 and the inner bore 11a of the yoke 12. The inner bore 11a of the yoke 12 is formed with a shallow cutout groove 12a at a position corresponding to the rear end fluid chamber (A).

Figure 2:
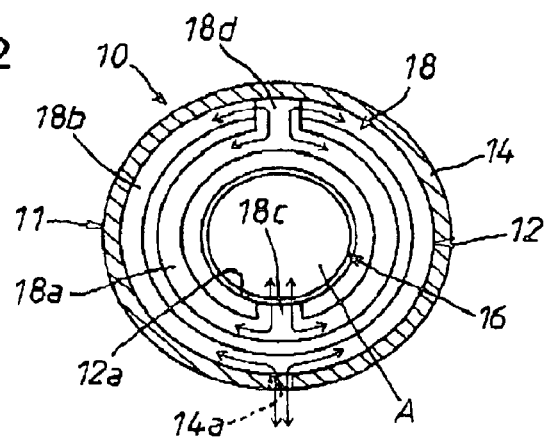
FIG. 2 is a sectional view of the solenoid-operated valve taken along the line A—A in FIG. 1.
Figure 3:
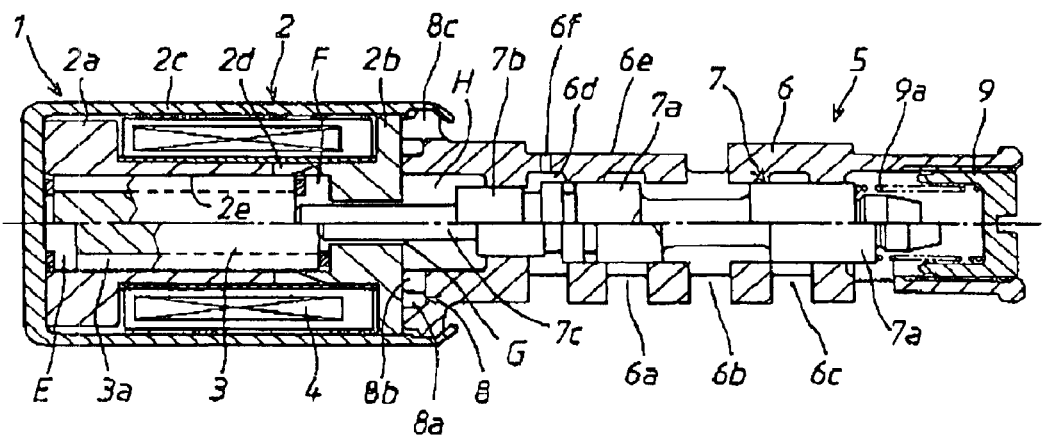
FIG. 3 is a longitudinal sectional view of a solenoid-operated valve which is hypothetically conceived of under the technological background prior to the present invention.

As best shown in FIG. 2, the rear end surface of the large-diameter portion of the yoke 12 is formed with an annular groove 18a at a radially mid position coaxially of the inner bore 11a and is also formed with a chamfer 18b of the same depth as the annular groove 18a at the outer circumferential portion thereof. The cutout groove 12a formed at the inner bore 11a is in communication with the annular groove 18a through an inside cutout 18c, while the annular groove 18a is in communication with the chamfer 18b through an outside cutout 18d. These inside and outside cutouts 18c, 18d are formed respectively at diametrically opposite positions (different 180 degrees in angular phase) on the rear end surface of the yoke 12. A hole 14a is formed in the cover 14 at a position which has the same angular phase as the inside cutout 18c and which is close to the inner bottom surface of the cover 14. The cover 14 covers the yoke 12 with its inner bottom surface abutting on the rear end surface of the yoke 12 which has the annular groove 18a, the chamfer 18b and the inside and outside cutouts 18c, 18d formed thereon, so that the annular groove 18a, the chamfer 18b and the inside and outside cutouts 18c, 18d are walled up thereby to form a supply/drain passage 18 of a labyrinth shape. Therefore, the rear end fluid chamber (A) is in communication with the external of the electromagnetic drive section 10 through the cutout groove 12a, the labyrinth supply/drain passage 18 and the hole 14a.

Referring back to FIG. 1, the vale section 20 is composed of the valve sleeve 21 and a spool 26 slidably received in a valve hole 22 which is formed coaxially in the valve sleeve 21. The valve sleeve 21 is secured to the stator 11 (i.e. to the core 13) in axial alignment therewith by caulking the opening end portion of the cover 14 with its flange portion being in abutting contact with the flange portion at the forward end portion of the core 13. The spool 26 is urged toward the electromagnetic drive section 10 by means of a spring 29, which is interposed between itself and a plug member 28 screwed into a forward end of the valve sleeve 21. A rod portion 26a which is formed to protrude from a rear end of the spool 26 extends passing through the center hole 13a of the core 13 and abuts on the forward end surface 16a of the plunger 16. Thus, in the inoperative state, the plunger 16 is kept at the aforementioned retracted position where the rear end surface 16b thereof abuts on the inner bottom surface of the cover 14. An intermediate fluid chamber (D) formed at the abutting portion between the core 13 and the valve sleeve 21 communicates with the electromagnetic section fluid chamber (B) through an annular clearance (C) which is formed between the center hole 13a of the core 13 and the rod portion 26a of the spool 26.

The valve hole 22 of the valve sleeve 21 has a large-diameter portion 22a at the side of the spring 29 and a small-diameter portion 22b opening to the intermediate fluid chamber (D) at the side of the core 13. The spool 26 has two large-diameter land portions 27a fit in the large-diameter portion 22a and a small-diameter land portion 27b fit in the small-diameter portion 22*b*. The diameter (d1) of the small-diameter land portion 27*b* is chosen to be the same as that (d2) of the plunger 16, and the rear end surface of the land portion 27*b* defines a part of the intermediate fluid chamber (D).

A control port 23*b* opens at the axial mid position of the valve hole 22 of the valve sleeve 21, and a supply port 23*a* and a drain port 23*c* are formed respectively at opposite sides of the control port 23*b*. The opening degree in communication of the control port 23*b* with the supply port 23*a* and the opening degree in communication of the control port 23 with the drain port 23*c* are increased or decreased reversely with each other in proportion to the moving amount of the spool 26 having the two large-diameter land portions 27*a*, whereby the oil output from the control port 23*b* can be controlled in pressure as well as in volume. At the internal surface of the valve hole 22 of the valve sleeve 21, an annular groove is formed between the large diameter portion 22*a* and the small-diameter portion 22*b* thereby to define a feedback chamber 24 which is isolated from the external. This feedback chamber 24 is in communication with the control port 23*b* through a communication hole 24*b* and a cutout portion 24*a* which is formed at a part of the external surface of the valve sleeve 21. This cutout portion 24*a* defines a closed space when the solenoid-operated valve is put in use with the valve sleeve 21 being fit in a valve sleeve receiving bore (not shown). An annular groove 25 is further formed at an axial mid position of the small-diameter portion 22*b* of the valve hole 22, namely, between the feedback chamber 24 and the intermediate fluid chamber (D). The inside of the annular groove 25 is in communication with another drain port 23*c*, and thus, the mid portion of the small-diameter land portion 27*b* is in communication with the drain port 23*c*.

When electric current is applied to the electromagnetic coil 17, the stator 11 is magnetized in proportion to the magnitude of the electric current applied thereto thereby to make the plunger 16 attracted toward the core 13, and the valve section 20 is operated to move the spool 26 against the spring 29, as depicted at the lower half in FIG. 1. With movement of the spool 26, the rear end fluid chamber (A) varies in volume. Therefore, the oil around the solenoid-operated valve is charged into the rear end fluid chamber (A) through the hole 14*a*, the labyrinth supply/drain passage 18 and the cutout 12*a*. Conversely, when the electric current applied to the electromagnetic coil 17 is diminished in magnitude, the plunger 16 is retracted by means of the spring 29, and the oil in the rear end fluid chamber (A) is discharged therefrom back through the cutout 12*a*, the labyrinth supply/drain passage 18 and the hole 14*a*.

In the foregoing embodiment, the diameter (d1) of the land portion 27*b* whose rear end surface defines a part of the intermediate fluid chamber (D) is made the same as the diameter (d2) of the plunger 16. Therefore, the sum in volume of the electromagnetic section fluid chamber (B) and the intermediate fluid chamber (D) which are in communication with each other through the clearance (C) between the center hole 13*a* and the rod portion 26*a* is kept invariable or constant regardless of the movement of the plunger 16. This advantageously make it unnecessary to provide any communication passage which would otherwise become necessary for making the intermediate fluid chamber (D) communicate with the external and any communication groove (or communication hole, hereafter referred to simply as "communication groove) which would also otherwise become necessary for communication between the rear end fluid chamber (A) and the electromagnetic section fluid chamber (B). Accordingly, the solenoid-operated valve in the embodiment can be simplified in construction. In particular, since the omission of such communication groove contributes to increasing the magnetic attraction force exerted on the plunger 16, the solenoid-operated valve in the embodiment can be downsized.

When the plunger 16 and the spool 26 are moved toward the right as viewed in FIG. 1, the volume of the electromagnetic section fluid chamber (B) decreases as the volume of the intermediate fluid chamber (D) increases, and the oil flows toward the right through the clearance (C) between the center hole 13*a* and the rod portion 26*a*. On the contrary, when the plunger 16 and the spool 26 are moved toward the left as viewed in FIG. 1, the oil flows toward the left through the clearance (C). That is, the direction in which the oil flows through the clearance (C) between the center hole 13*a* and the rod portion 26*a* upon movement of the plunger 16 and the spool 26 coincides with the moving direction of the rod portion 26*a*. Thus, the viscosity of the oil flowing through the clearance (C) serves to aid or expedite the movement of the rod portion 26*a* which is moved together with the spool 26, so that the responsivety of the solenoid-operated valve can be enhanced.

In the foregoing embodiment, the annular groove 25 formed at the mid portion of the small-diameter portion 22*b* of the valve hole 22 or in-between the feedback chamber 24 and the intermediate fluid chamber (D) communicates with the drain port 23*c* to expose the mid portion of the small-diameter land portion 27*b* to the drain port 23*c*. With this arrangement, the oil including foreign matter such as iron powder which oil leaks from the feedback chamber 24 through a clearance between the valve hole 22 and the small-diameter land portion 27*b* is discharged from the annular groove 25 formed between the feedback chamber 24 and the intermediate fluid chamber (D), to the drain port 23*c*. Therefore, the foreign matter is prevented from entering the intermediate fluid chamber (D) thereby to increase the content of the foreign matter within the intermediate fluid chamber (D). Since the foreign matter hardly enters the electromagnetic section fluid chamber (B) from the valve section 20 through the intermediate fluid chamber (D), it hardly occur that such foreign matter gets into the clearance between the inner bore 11*a* of the stator 11 and the plunger 16 to deteriorate the movement of the plunger or to bring the same into a lock. Or, the time can be extended for the plunger 16 to reach such undesirable state.

In the foregoing embodiment, the supply/drain passage 18 for making the rear end fluid chamber (A) communicate with the external is constituted by abutting the inner bottom surface of the cover 14 on the rear end surface of the yoke 12 which has the annular groove 18*a*, the chamfer 18*b* and the cutouts 18*c*, 18*d* formed thereon. Since the provision of the annular groove 18*a*, the chamfer 18*b* and the cutouts 18*c*, 18*d* on the rear end surface of the yoke 12 can be carried out easily by cutting or by metal forming, it can be attained to lower the manufacturing cost of the solenoid-operated valve. It is however apparent that the annular groove 18*a*, the cutouts 18*c*, 18*d* and the like which constitute the supply/drain passage 18 may be provided by forging or the like not on the rear end surface of the yoke 12 but on the inner bottom surface or may be provided on both of the rear end surface of the yoke 12 and the inner bottom surface of the cover 14. That is, since the supply/drain passage 18 can be constituted by forming a hollow groove at least one of the inner bottom surface of the cover 14 and the rear end surface of the yoke 12 which are kept in abutting engagement with each other, the provision of the supply/drain passage 18 becomes easy, so that the manufacturing cost for the solenoid-operated valve can be reduced.

Further, in the foregoing embodiment, the supply/drain passage 18 takes the form of a labyrinth, in which case the time is extended until the foreign matter such as minute iron powder flowing in the oil around the solenoid-operated valve which oil comes in or out of the same through the supply/drain passage 18 reaches the rear end fluid chamber (A). Therefore, a substantial extension of time can be attained until the plunger 16 gets worse in movement or is brought into a lock. Theses advantages of the labyrinth supply/drain passage 18 can easily be appreciated in the following viewpoint. That is, through the supply/drain passage 18, the oil around the solenoid-operated valve is charged into the rear end fluid chamber (A) or discharged therefrom as the same varies its volume with the movement of the plunger 16. Since the supply/drain passage 18 is formed to be a labyrinth, the foreign matter such as minute iron powder flowing in the oil subsides or deposits while moving back and forth in the labyrinth supply/drain passage 18. As a result, the foreign matter is separated from the oil which comes into the rear end fluid chamber (A) and hence, can be prevented from entering the rear end fluid chamber (A) at the early stage in use of the solenoid-operated valve.

Although the supply/drain passage 18 takes the form of a labyrinth, it is not limited to being the labyrinth and may rather be a passage simple in shape.

Obviously, numerous modifications and variations of the present invention are possible in light of the above teachings. It is therefore to be understood that within the scope of the appended claims, the present invention may be practiced otherwise than as specifically described herein.

What is claimed is:

1. A solenoid-operated valve comprising a stator having a yoke and a core arranged serially in axial alignment with each other; a plunger received in said stator to be slidably guided in an inner bore formed in at least one of said yoke and said core and urged by a spring in one direction; an electromagnetic coil for energizing said stator to move said plunger axially against said spring; a valve sleeve attached to an outer end portion of said core; a spool received slidably in a valve hole of said valve sleeve and connected to said plunger through a rod portion thereof passing through a center hole of said core to be movable together with said plunger; an electromagnetic section fluid chamber defined by a forward end of said plunger at the side of said valve sleeve and said inner bore of said core; an intermediate fluid chamber formed between said core and said valve sleeve and partly defined by an end surface of a land portion which is formed on said spool at the side of said core; and a clearance between said center hole and said rod portion for making said electromagnetic section fluid chamber and said intermediate fluid chamber communicate with each other; and a rear end fluid chamber formed between a rear end surface of said plunger and said inner bore of said yoke and variable in its volume with movement of said plunger; wherein the diameter of said plunger is chosen to be the same as that of said land portion and wherein said rear end fluid chamber communicates with the external of said solenoid-operated valve through a supply/drain passage.

2. The solenoid-operated valve as set forth in claim 1, wherein the mid portion of said land portion communicates with a drain port formed in said valve sleeve.

3. The solenoid-operated valve as set forth in claim 1, wherein said stator further includes a cover which covers the external surfaces of said yoke and said core thereby to magnetically connect the opposite end portions of said yoke and said core, and wherein said supply/drain passage is defined by a hollow groove formed on at least one of an inner bottom surface of said cover and the rear end surface of said yoke which are kept in abutting engagement with each other.

4. The solenoid-operated valve as set forth in claim 3, wherein said supply/drain passage takes the form of a labyrinth.

* * * * *